(12) United States Patent
Ju et al.

(10) Patent No.: US 12,060,467 B2
(45) Date of Patent: Aug. 13, 2024

(54) MOLDED PRODUCT HAVING FABRIC TEXTURE

(71) Applicant: LOTTE CHEMICAL CORPORATION, Seoul (KR)

(72) Inventors: Min Ji Ju, Uiwang-si (KR); Sang U Min, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 717 days.

(21) Appl. No.: 17/268,645

(22) PCT Filed: Aug. 29, 2019

(86) PCT No.: PCT/KR2019/011080
§ 371 (c)(1),
(2) Date: Feb. 16, 2021

(87) PCT Pub. No.: WO2020/046013
PCT Pub. Date: Mar. 5, 2020

(65) Prior Publication Data
US 2021/0179792 A1    Jun. 17, 2021

(30) Foreign Application Priority Data

Aug. 31, 2018 (KR) .................. 10-2018-0103555
Aug. 21, 2019 (KR) .................. 10-2019-0102221

(51) Int. Cl.
| | | |
|---|---|---|
| C08J 5/04 | (2006.01) | |
| C08K 3/04 | (2006.01) | |
| C08L 1/02 | (2006.01) | |
| C08L 25/04 | (2006.01) | |
| C08L 51/04 | (2006.01) | |

(52) U.S. Cl.
CPC .............. *C08J 5/045* (2013.01); *C08K 3/04* (2013.01); *C08L 1/02* (2013.01); *C08L 25/04* (2013.01); *C08L 51/04* (2013.01)

(58) Field of Classification Search
CPC .... C08J 5/045; C08K 3/04; C08L 1/02; C08L 25/04; C08L 51/04
USPC ......................................................... 524/14
See application file for complete search history.

(56) References Cited

U.S. PATENT DOCUMENTS

| | | | | |
|---|---|---|---|---|
| 2011/0130487 A1* | 6/2011 | Noh | .......................... | C08L 1/00 524/35 |
| 2015/0247058 A1 | 9/2015 | Noh et al. | | |
| 2018/0142071 A1* | 5/2018 | Ju | .......................... | C08K 3/40 |

FOREIGN PATENT DOCUMENTS

| | | | |
|---|---|---|---|
| CN | 102086284 A | | 6/2011 |
| CN | 106536603 A | | 3/2017 |
| JP | 2001-113543 A | | 4/2001 |
| JP | 2005-036114 A | | 2/2005 |
| JP | 2015-120938 A | | 7/2015 |
| KR | 10-2011-0062076 A | | 6/2011 |
| KR | 1020110062076 A | * | 6/2011 |
| KR | 10-1476057 B1 | | 12/2014 |
| KR | 10-2015-0103541 A | | 9/2015 |
| KR | 10-2017-0093094 A | | 8/2017 |
| KR | 1020170093094 A | * | 8/2017 |
| WO | 2020/046013 A1 | | 3/2020 |

OTHER PUBLICATIONS

International Search Report in counterpart International Application No. PCT/KR2019/011080 dated Dec. 6, 2019, pp. 1-6.
Office Action in counterpart Chinese Application No. 201980056750.1 dated Jul. 4, 2022, pp. 1-6.

\* cited by examiner

*Primary Examiner* — Ling Siu Cho
*Assistant Examiner* — Ronald Grinsted
(74) *Attorney, Agent, or Firm* — Additon, Pendelton & Witherspoon, P.A.

(57) ABSTRACT

A molded product according to the present invention is a molded product having a structure in which colored particles are dispersed in thermoplastic resin, wherein the colored particles have an average particle size of about 250-3,200 μm as measured by a particle size analyzer, and are included in an amount of about 0.05-5 parts by weight with respect to about 100 parts by weight of the thermoplastic resin, a three-dimensional pattern is formed on at least one surface of the molded product, and the three-dimensional pattern has a 10-point average roughness (Rz) of about 50-500 μm and a number of different brightness values of about 30-60. The molded product has excellent impact resistance, excellent heat resistance, and the like, and has an appearance similar to actual fabric.

14 Claims, No Drawings

MOLDED PRODUCT HAVING FABRIC TEXTURE

CROSS-REFERENCE TO RELATED APPLICATIONS

This application claims priority to and the benefit of International Application No. PCT/KR2019/011080, filed Aug. 29, 2019, which published as WO 2020/046013 on Mar. 5, 2020; Korean Patent Application No. 10-2018-0103555, filed in the Korean Intellectual Property Office on Aug. 31, 2018; and Korean Patent Application No. 10-2019-0102221, filed in the Korean Intellectual Property Office on Aug. 21, 2019, the entire disclosure of each of which is incorporated herein by reference.

TECHNICAL FIELD

The present invention relates to a molded product having a fabric texture and a method of manufacturing the same. More particularly, the present invention relates to a molded product which has a similar appearance to actual fabric while having good properties in terms of impact resistance and heat resistance, and a method of manufacturing the same.

BACKGROUND ART

Thermoplastic resins are useful as materials for housings of electrical/electronic products, interior/exterior materials for automobiles, and exterior materials for construction due to lower specific gravity than glass or metal and good properties in terms of moldability and impact resistance. With increasing use of thermoplastic resins as exterior materials, there is increasing demand for exterior materials that can meet consumer demand for luxurious appearance, particularly, exterior materials having a fabric texture.

Typically, materials having a fabric texture are manufactured by blending actual fabric with a thermoplastic resin, by applying a general pattern etching process to a thermoplastic resin product, or by in-mold forming, attachment, or printing of a patterned film having a fabric texture.

However, these methods have disadvantages of deterioration in physical properties of a thermoplastic resin, increase in costs, increase in number of process steps, and poor eco-friendliness due to use of adhesives, films, and the like.

Therefore, there is a need for a molded product which has a similar appearance to actual fabric without deterioration in physical properties such as impact resistance and heat resistance.

The background technique of the present invention is disclosed in Korean Patent Laid-open Publication No. 10-2015-0103541.

DISCLOSURE

Technical Problem

It is one aspect of the present invention to provide a molded product which has a similar appearance to actual fabric while having good properties in terms of impact resistance and heat resistance.

It is another aspect of the present invention to provide a method of manufacturing the molded product set forth above.

The above and other aspects of the present invention will become apparent from the detailed description of the following embodiments.

Technical Solution

1. One aspect of the present invention relates to a molded product. The molded product has a structure in which colored particles are dispersed in a thermoplastic resin, the molded article having a three-dimensional pattern formed on at least one surface thereof, wherein the colored particles have an average particle diameter of about 250 μm to about 3,200 μm, as measured using a particle size analyzer, and are present in an amount of about 0.05 parts by weight to about 5 parts by weight relative to about 100 parts by weight of the thermoplastic resin, and the three-dimensional pattern has a ten-point average roughness (Rz) of about 50 μm to about 500 μm and about 30 to about 60 different brightness values, the number of different brightness values being calculated by scanning a 3 mm×3 mm area of the three-dimensional pattern at a resolution of 600 dpi, converting the scanned image into an image represented by 4,900 pixels, and measuring brightness (L*) of each pixel using the CIE 1976 L*a*b* (CIELAB) color system.

2. In embodiment 1, the thermoplastic resin may include at least one of a polycarbonate resin and a rubber-modified aromatic vinyl copolymer resin.

3. In embodiment 1 or 2, the rubber-modified aromatic vinyl copolymer resin may include: about 10 wt % to about 100 wt % of a rubber-modified vinyl graft copolymer obtained by graft copolymerization of an aromatic vinyl monomer and a monomer copolymerizable with the aromatic vinyl monomer to a rubber polymer; and, optionally, about 90 wt % or less of an aromatic vinyl copolymer resin obtained by copolymerization of an aromatic vinyl monomer and a monomer copolymerizable with the aromatic vinyl monomer.

4. In embodiments 1 to 3, the colored particles may have a brightness difference of about 20 to about 99 from the thermoplastic resin.

5. In embodiments 1 to 4, the colored particles may include at least one of cellulose and carbon fiber.

6. In embodiments 1 to 5, the colored particles may have an aspect ratio of about 0.015 to about 0.08.

7. In embodiments 1 to 6, when the thermoplastic resin is a diene rubber-modified aromatic vinyl copolymer resin, the molded product may have a notched Izod impact strength of about 9 kgf·cm/cm to about 50 kgf·cm/cm, as measured on a ¼" thick specimen according to ASTM D256, and, when the thermoplastic resin is a combination of a polycarbonate resin and a diene rubber-modified aromatic vinyl copolymer resin, the molded product may have a notched Izod impact strength of about 15 kgf·cm/cm to about 50 kgf·cm/cm, as measured on a ¼" thick specimen according to ASTM D256, and, when the thermoplastic resin is a combination of a polycarbonate resin and a (meth)acrylate rubber-modified aromatic vinyl copolymer resin, the molded product may have a notched Izod impact strength of about 9 kgf·cm/cm to about 50 kgf·cm/cm, as measured on a ¼" thick specimen according to ASTM D256.

8. In embodiments 1 to 7, when the thermoplastic resin is a diene rubber-modified aromatic vinyl copolymer resin, the molded product may have a heat deflection temperature (HDT) of about 82° C. to about 125° C., as measured at a heating rate of 120° C./hr under a load of 18.56 kgf/cm² in accordance with ASTM D648, and, when the thermoplastic resin is a combination of a polycarbonate resin and a diene rubber-modified aromatic vinyl copolymer resin, the molded product may have a heat deflection temperature (HDT) of about 108° C. to about 125° C., as measured at a heating rate of 120° C./hr under a load of 18.56 kgf/cm² in accordance with ASTM D648, and, when the thermoplastic resin is a combination of a polycarbonate resin and a (meth)acrylate rubber-modified aromatic vinyl copolymer resin, the molded product may have a heat deflection temperature (HDT) of about 82° C. to about 125° C., as measured at a heating rate of 120° C./hr under a load of 18.56 kgf/cm² in accordance with ASTM D648.

9. Another aspect of the present invention relates to a method of manufacturing a molded product. The method includes injecting a thermoplastic resin composition using an injection machine provided with a mold capable of forming a three-dimensional pattern having a ten-point average roughness (Rz) of about 50 μm to about 500 μm on at least one surface of the molded product, wherein the thermoplastic resin composition includes about 100 parts by weight of a thermoplastic resin and about 0.05 parts by weight to about 5 parts by weight of colored particles having an average particle diameter of about 250 μm to about 3,200 μm, as measured using a particle size analyzer.

10. In embodiment 9, injection of the thermoplastic resin composition may be performed under conditions of an injection temperature of about 200° C. to about 320° C. and a mold temperature of about 40° C. to about 80° C.

Advantageous Effects

The present invention provides a molded product which has a similar appearance to actual fabric while having good properties in terms of impact resistance and heat resistance, and a method of manufacturing the same.

BEST MODE

Hereinafter, embodiments of the present invention will be described in detail.

A molded product according to the present invention is a molded product having a fabric texture and has a structure in which colored particles are dispersed in a thermoplastic resin, is formed of a thermoplastic resin composition, and has a three-dimensional pattern formed on at least one surface thereof.

As used herein to represent a specific numerical range, the expression "a to b" means "≥a and ≤b".

The thermoplastic resin composition according to one embodiment of the present invention includes: (A) a thermoplastic resin; and (B) colored particles.

(A) Thermoplastic Resin

The thermoplastic resin according to the present invention may include any suitable thermoplastic resin used in typical thermoplastic resin compositions. For example, the thermoplastic resin may include a polycarbonate resin and/or a rubber-modified aromatic vinyl copolymer resin. Specifically, the thermoplastic resin may be the polycarbonate resin or a combination of the polycarbonate resin and the rubber-modified aromatic vinyl copolymer resin.

(a) Polycarbonate Resin

The polycarbonate resin according to one embodiment of the present invention may include any suitable polycarbonate resin used in typical thermoplastic resin compositions. For example, the polycarbonate resin may be an aromatic polycarbonate resin prepared by reacting diphenols (aromatic diol compounds) with a carbonate precursor, such as phosgene, halogen formate, or carbonic diester.

In some embodiments, the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis-(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, or 1,1-bis(4-hydroxyphenyl)cyclohexane, specifically 2,2-bis(4-hydroxyphenyl)propane, which is also referred to as bisphenol A.

In some embodiments, the carbonate precursor may include, for example, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, carbonyl chloride (phosgene), diphosgene, triphosgene, carbonyl bromide, and bishaloformate. These may be used alone or as a mixture thereof.

In some embodiments, the polycarbonate resin may be a branched polycarbonate resin. For example, the polycarbonate resin may be prepared by adding about 0.05 mol % to about 2 mol % of a tri- or higher polyfunctional compound, specifically a tri- or higher valent phenol group-containing compound, based on the total number of moles of the diphenols used in polymerization.

In some embodiments, the polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 200,000 g/mol, for example, about 15,000 g/mol to about 40,000 g/mol, as measured by gel permeation chromatography (GPC). Within this range, the thermoplastic resin composition can have good properties in terms of impact resistance, stiffness, and heat resistance.

(b) Rubber-Modified Aromatic Vinyl Copolymer Resin

The rubber-modified aromatic vinyl copolymer resin according to one embodiment of the present invention is a thermoplastic resin having good balance between physical properties, such as impact resistance, fluidity, and heat resistance, and may be used in various applications, such as interior/exterior materials for construction and interior/exterior materials for automobiles.

In some embodiments, the rubber-modified aromatic vinyl copolymer resin may include: (b1) about 10 wt % to about 100 wt % of a rubber-modified vinyl graft copolymer obtained by graft copolymerization of an aromatic vinyl monomer and a monomer copolymerizable with the aromatic vinyl monomer to a rubber polymer; and, optionally, (b2) about 90 wt % or less of an aromatic vinyl copolymer resin obtained by copolymerization of an aromatic vinyl monomer and a monomer copolymerizable with the aromatic vinyl monomer. That is, the rubber-modified vinyl graft copolymer (b1) alone or a mixture of the rubber-modified vinyl graft copolymer (b1) and the aromatic vinyl copolymer resin (b2) may be used as the rubber-modified aromatic vinyl copolymer resin according to the present invention.

In some embodiments, the rubber-modified vinyl graft copolymer (b1) may be obtained by adding the aromatic vinyl monomer and the monomer copolymerizable with the aromatic vinyl monomer to the rubber polymer, followed by polymerization. The aromatic vinyl copolymer resin (b2) may be obtained by polymerization of the aromatic vinyl monomer with the monomer copolymerizable with the aromatic vinyl monomer. Here, the polymerization process may be carried out by any known polymerization method, such as emulsion polymerization, suspension polymerization, or mass polymerization. When the polymerization process is carried out by mass polymerization, the rubber-modified aromatic vinyl copolymer resin in which the rubber-modified vinyl graft copolymer (b1) is dispersed in the aromatic vinyl copolymer resin (b2) as a matrix may be prepared through a one-step reaction process without separately preparing the rubber-modified vinyl graft copolymer (b1) and the aromatic vinyl copolymer resin (b2).

In some embodiments, the rubber (rubber polymer) may be present in an amount of 5 wt % to 50 wt % in the final rubber-modified aromatic vinyl copolymer resin and may have an average (Z-average) particle diameter of about 0.2 μm to about 15 μm, for example, about 0.3 μm to about 10 μm, as measured by a particle size analyzer. Within these ranges, it is possible to obtain a thermoplastic resin composition which has good impact resistance and can realize a three-dimensional texture. Here, the average (Z-average) particle diameter of the rubber polymer (rubber particles) may be measured on a specimen in a latex state by light scattering particle size analysis. Specifically, the average (Z-average) particle diameter of the rubber polymer may be determined through a process in which a latex of the rubber polymer is filtered through a mesh to remove coagulant formed during polymerization of the rubber polymer, followed by pouring a mixed solution of 0.5 g of the latex and 30 ml of distilled water into a 1,000 ml flask, and then filling the flask with distilled water to prepare a specimen, 10 ml of which, in turn, is transferred to a quartz cell, followed by measurement of the average particle diameter using a light scattering particle size analyzer (Nano-ZS, Malvern Instrument).

Now, the rubber-modified vinyl graft copolymer (b1) and the aromatic vinyl copolymer resin (b2) will be described in more detail.

(b1) Rubber-Modified Vinyl Graft Copolymer

The rubber-modified vinyl graft copolymer may be obtained by graft copolymerization of the aromatic vinyl monomer and the monomer copolymerizable with the aromatic vinyl monomer to the rubber polymer. The rubber-modified vinyl graft copolymer may further include a monomer for imparting processability and heat resistance, as needed.

Examples of the rubber polymer may include diene rubbers, such as polybutadiene, poly(styrene-butadiene), and poly(acrylonitrile-butadiene), saturated rubbers obtained by hydrogenation of the diene rubbers, isoprene rubbers, $C_2$ to $C_{10}$ alkyl (meth)acrylate rubbers, $C_2$ to $C_{10}$ alkyl (meth)acrylate-styrene copolymers, and ethylene-propylene-diene terpolymers (EPDMs). These may be used alone or as a mixture thereof. For example, the rubber polymer may include diene rubbers and (meth)acrylate rubbers, specifically, butadiene rubber and butyl acrylate rubber.

In some embodiments, the rubber polymer may be present in an amount of about 5 wt % to about 65 wt %, for example, about 10 wt % to about 60 wt %, specifically about 20 wt % to about 50 wt %, based on the total weight of the rubber-modified vinyl graft copolymer (b1). Within this range, the rubber-modified aromatic vinyl copolymer resin can have good mechanical properties such as impact resistance.

In some embodiments, the rubber polymer may have an average (Z-average) particle diameter of about 250 nm to about 3,000 nm, for example, about 350 nm to about 2,000 nm, as measured by a particle size analyzer. Within this range, it is possible to obtain a thermoplastic resin composition which has good impact resistance and can realize a three-dimensional texture. Here, the average (Z-average) particle diameter of the rubber polymer (rubber particles) may be measured on a specimen in a latex state by light scattering particle size analysis. Specifically, the average (Z-average) particle diameter of the rubber polymer may be determined through a process in which a latex of the rubber polymer is filtered through a mesh to remove coagulant formed during polymerization of the rubber polymer, followed by pouring a mixed solution of 0.5 g of the latex and 30 ml of distilled water into a 1,000 ml flask, and then filling the flask with distilled water to prepare a specimen, 10 ml of which, in turn, is transferred to a quartz cell, followed by measurement of the average particle diameter using a light scattering particle size analyzer (Nano-ZS, Malvern Instrument).

The aromatic vinyl monomer is graft-copolymerizable to the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 15 wt % to about 94 wt %, for example, about 20 wt % to about 80 wt %, specifically about 30 wt % to about 60 wt %, based on the total weight of the rubber-modified vinyl graft copolymer (b1). Within this range, it is possible to obtain a rubber-modified aromatic vinyl copolymer resin which has good mechanical properties.

The monomer copolymerizable with the aromatic vinyl monomer may include, for example, vinyl cyanide compounds, such as acrylonitrile, and unsaturated nitrile compounds, such as ethacrylonitrile and methacrylonitrile. These may be used alone or as a mixture thereof. The monomer copolymerizable with the aromatic vinyl monomer may be present in an amount of about 1 wt % to about 50 wt %, for example, about 5 wt % to about 45 wt %, specifically about 10 wt % to about 30 wt %, based on the total weight of the rubber-modified vinyl graft copolymer (b1). Within this range, it is possible to obtain a rubber-modified aromatic vinyl copolymer resin which has good mechanical properties.

The monomer for imparting processability and heat resistance may include, for example, acrylic acids, (meth)acrylic acids, maleic anhydrides, and N-substituted maleimides, without being limited thereto. These may be used alone or as a mixture thereof. The monomer for imparting processability and heat resistance may be optionally present in an amount of about 15 wt % or less, for example, about 0.1 wt % to about 10 wt %, based on the total weight of the rubber-modified vinyl graft copolymer (b1). Within this range, the monomer for imparting processability and heat resistance can impart processability and heat resistance to the thermoplastic resin composition without deterioration in other properties.

In some embodiments, the rubber-modified vinyl graft copolymer may include, for example, an acrylonitrile-butadiene-styrene graft copolymer (g-ABS) obtained by graft copolymerization of styrene as the aromatic vinyl monomer and acrylonitrile as the vinyl cyanide monomer to a butadiene rubber polymer and an acrylate-styrene-acrylonitrile graft copolymer (g-ASA) obtained by graft copolymerization of styrene as the aromatic vinyl monomer and acrylonitrile as the vinyl cyanide monomer to a butyl acrylate rubber polymer.

(b2) Aromatic Vinyl Copolymer Resin

The aromatic vinyl copolymer resin may be prepared using the components of the rubber-modified vinyl graft copolymer (b1) except for the rubber (rubber polymer), that is, using a monomer mixture including monomers as described above. Here, the ratio between the monomers in the monomer mixture may vary depending on compatibility therebetween. For example, the aromatic vinyl copolymer resin may be obtained by copolymerization of the aromatic vinyl monomer and the monomer copolymerizable with the aromatic vinyl monomer.

The aromatic vinyl monomer may include, for example, styrene, α-methyl styrene, β-methyl styrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof.

The monomer copolymerizable with the aromatic vinyl monomer may include, for example, vinyl cyanide compounds, such as acrylonitrile, and unsaturated nitrile compounds, such as ethacrylonitrile and methacrylonitrile. These may be used alone or as a mixture thereof.

The aromatic vinyl copolymer resin may further include the monomer for imparting processability and heat resistance. The monomer for imparting processability and heat resistance may include, for example, acrylic acids, (meth)acrylic acids, maleic anhydrides, and N-substituted maleimides, without being limited thereto. These may be used alone or as a mixture thereof.

The aromatic vinyl monomer may be present in an amount of about 50 wt % to about 95 wt %, for example, about 60 wt % to about 90 wt %, specifically about 70 wt % to about 80 wt %, based on the total weight of the aromatic vinyl copolymer resin. Within this range, the thermoplastic resin composition can have good impact strength and good balance between mechanical properties.

The monomer copolymerizable with the aromatic vinyl monomer may be present in an amount of about 5 wt % to about 50 wt %, for example, about 10 wt % to about 40 wt %, specifically about 20 wt % to about 30 wt %, based on the total weight of the aromatic vinyl copolymer resin. Within this range, the thermoplastic resin composition can have good impact strength and good balance between mechanical properties.

The monomer for imparting processability and heat resistance may be optionally present in an amount of about 30 wt % or less, for example, about 0.1 wt % to about 20 wt %, based on the total weight of the aromatic vinyl copolymer resin. Within this range, the monomer for imparting processability and heat resistance can impart processability and heat resistance to the thermoplastic resin composition without deterioration in other properties.

The aromatic vinyl copolymer resin may have a weight average molecular weight of about 50,000 g/mol to about 500,000 g/mol, without being limited thereto.

As the rubber-modified aromatic vinyl copolymer resin according to the present invention, the rubber-modified vinyl graft copolymer (c1) alone, such as an acrylonitrile-butadiene-styrene graft copolymer (g-ABS) obtained by graft copolymerization of styrene as the aromatic vinyl monomer and acrylonitrile as the unsaturated nitrile compound to a butadiene rubber polymer core, or a mixture of rubber-modified vinyl graft copolymer (b1) the aromatic vinyl copolymer resin (b2), such as an acrylonitrile-butadiene-styrene copolymer resin (ABS resin), an acrylonitrile-ethylene propylene rubber-styrene copolymer resin (AES resin), and an acrylonitrile-acrylic rubber-styrene copolymer resin (AAS resin), may be used. Here, the ABS resin may have a structure in which g-ABS as the rubber-modified vinyl graft copolymer (b1) is dispersed in a styrene-acrylonitrile copolymer resin (SAN resin) as the aromatic vinyl copolymer resin (b2).

In some embodiments, when the thermoplastic resin is a combination of the polycarbonate resin (a) and the rubber-modified aromatic vinyl copolymer resin (b), the polycarbonate resin (a) may be present in an amount of about 5 wt % to about 95 wt %, for example, about 30 wt % to about 70 wt %, based on the total weight of the thermoplastic resin, and the rubber-modified aromatic vinyl copolymer resin (b) may be present in an amount of about 5 wt % to about 95 wt %, for example, about 30 wt % to about 70 wt %, based on the total weight of the thermoplastic resin. Within these ranges, the thermoplastic resin composition can have good impact resistance and heat resistance.

(B) Colored Particles

The colored particles according to the present invention are included in the thermoplastic resin, which is used to manufacture a molded product having a three-dimensional pattern, to broaden the color spectrum of the molded product, thereby allowing the molded product to have a similar appearance to actual fabric. The colored particles may have an acicular (fibrous) shape. In addition, the colored particles may have an average particle diameter of about 250 μm to about 3,200 μm, for example, about 350 μm to about 3,000 μm, as measured using a particle size analyzer, and a pre-processing cross-sectional diameter of about 10 μm to about 100 μm, for example about 15 μm to about 80 μm. When the average particle diameter of the colored particles is outside this range, the width of the color spectrum (the number of different brightness values) of the molded product is reduced, making it difficult for the molded product to have a fabric texture.

In some embodiments, the colored particles may have a brightness (L*) difference of about 20 to about 99, for example, about 20 to about 80, from the thermoplastic resin, as measured using the CIE 1976 L*a*b* (CIELAB) color system. Within this range, it is possible to obtain a molded product having a similar texture (especially, visual texture) to actual fabric.

In some embodiments, the colored particles may have an aspect ratio of about 0.015 to about 0.08, for example, about 0.018 to about 0.08. Here, the aspect ratio refers to a ratio of minor-axis diameter to major-axis diameter in cross-section of the acicular (fibrous) colored particles. Within this range, it is possible to obtain a molded product having a similar texture (especially, visual texture) to actual fabric.

In some embodiments, the colored particles may include cellulose, carbon fiber, and a combination thereof.

In some embodiments, the colored particles may be present in an amount of about 0.05 parts by weight to about 5 parts by weight, for example, about 0.1 parts by weight to about 3 parts by weight, relative to about 100 parts by weight of the thermoplastic resin. If the amount of the colored particles is less than about 0.05 parts by weight, the thermoplastic resin composition and a molded product formed thereof can have poor properties in terms of color spectrum and dispersibility, whereas, if the amount of the colored particles exceeds about 5 parts by weight, the thermoplastic resin composition and a molded product formed thereof can have poor properties in terms of impact resistance and heat resistance.

In addition to the aforementioned components, the thermoplastic resin composition according to the embodiment of the present invention may further include additives without altering the benefits of the present invention. Examples of the additives may include a flame retardant, an antioxidant, am anti-dripping agent, a lubricant, a release agent, a nucleating agent, an antistatic agent, a stabilizer, a colorant, and mixtures thereof, without being limited thereto.

In some embodiments, the thermoplastic resin composition according to the present invention may be prepared in pellet form by mixing the aforementioned components, followed by melt extrusion in a typical twin-screw extruder at about 200° C. to about 280° C., for example, about 220° C. to about 260° C.

In some embodiments, when the thermoplastic resin is a diene rubber-modified aromatic vinyl copolymer resin (for example, g-ABS/SAN), the thermoplastic resin composition (a molded product thereof) may have a notched Izod impact strength of about 9 kgf·cm/cm to about 50 kgf·cm/cm, for example, about 10 kgf·cm/cm to about 30 kgf·cm/cm, as measured on a ¼" thick specimen in accordance with ASTM D256.

In some embodiments, when the thermoplastic resin is a combination of the polycarbonate resin and a diene rubber-modified aromatic vinyl copolymer resin (for example, g-ABS/SAN), the thermoplastic resin composition (a molded product thereof) may have a notched Izod impact strength of about 15 kgf·cm/cm to about 50 kgf·cm/cm, for example, about 18 kgf·cm/cm to about 40 kgf·cm/cm, as measured on a ¼" thick specimen in accordance with ASTM D256.

In some embodiments, when the thermoplastic resin is a combination of the polycarbonate resin and a (meth)acrylate rubber-modified aromatic vinyl copolymer resin (for example, g-ASA/SAN), the thermoplastic resin composition (a molded product thereof) may have a notched Izod impact strength of about 9 kgf·cm/cm to about 50 kgf·cm/cm, for example, about 10 kgf·cm/cm to about 40 kgf·cm/cm, as measured on a ¼" thick specimen in accordance with ASTM D256.

In some embodiments, when the thermoplastic resin is a diene rubber-modified aromatic vinyl copolymer resin (for example, g-ABS/SAN), the thermoplastic resin composition (a molded product thereof) may have a heat deflection temperature (HDT) of about 82° C. to about 125° C., for example, about 85° C. to about 115° C., as measured at a heating rate of 120° C./hr under a load of 18.56 kgf/cm² in accordance with ASTM D648.

In some embodiments, when the thermoplastic resin is a combination of the polycarbonate resin and a diene rubber-modified aromatic vinyl copolymer resin (for example, g-ABS/SAN), the thermoplastic resin composition (a molded product thereof) may have a heat deflection temperature (HDT) of about 108° C. to about 125° C., for example, about 110° C. to about 120° C., as measured at a heating rate of 120° C./hr under a load of 18.56 kgf/cm² in accordance with ASTM D648.

In some embodiments, when the thermoplastic resin is a combination of the polycarbonate resin and a (meth)acrylate rubber-modified aromatic vinyl copolymer resin (for example, g-ASA/SAN), the thermoplastic resin composition (a molded product thereof) may have a heat deflection temperature (HDT) of about 82° C. to about 125° C., for example, about 84° C. to about 115° C., as measured at a heating rate of 120° C./hr under a load of 18.56 kgf/cm² in accordance with ASTM D648.

A molded product according to the present invention is formed of the thermoplastic resin composition set forth above and has a three-dimensional pattern formed on at least one surface thereof, wherein the three-dimensional pattern has a ten-point average roughness (Rz) of about 50 μm to about 500 μm, for example about 70 μm to about 450 μm. When the ten-point average roughness (Rz) of the three-dimensional pattern is outside this range, the width of the color spectrum (the number of different brightness values) of the molded product can be reduced, making it difficult for the molded product to have a fabric texture.

Here, the ten-point average roughness (ten-point height of irregularity) (Rz) is calculated through a process in which a reference length is extracted from a roughness curve measured with a microscope in the direction of an average line of the roughness curve, followed by obtaining the sum of the absolute average value of heights (Yp) of five highest peaks and the absolute average value of depths (Yv) of five lowest valleys measured in the direction of longitudinal magnification of the average line of the sampled part, and then the obtained value is expressed in μm, as represented in Equation 1.

$$R_z = \frac{|Y_{p1} + Y_{p2} + Y_{p3} + Y_{p4} + Y_{p5}| + |Y_{v1} + Y_{v2} + Y_{v3} + Y_{v4} + Y_{v5}|}{(5)}$$ [Equation 1]

In some embodiments, the molded product may have 30 to 60, for example, 30 to 50 different brightness values, the number of different brightness values being calculated by scanning a 3 mm×3 mm area of the three-dimensional pattern, converting the scanned image into an image represented by 4,900 pixels, and measuring the brightness (L*) of each pixel using the CIE 1976 L*a*b* (CIELAB) color system. If the number of different brightness values is less than 30, the color spectrum of the molded product can be excessively narrow, making it difficult for the molded product to have a fabric texture, whereas, if the number of different brightness values exceeds about 60, it is difficult for the molded product to have a fabric texture and a beautiful appearance.

In some embodiments, the molded product may be manufactured by injecting the thermoplastic resin composition using an injection machine provided with a mold capable of forming the three-dimensional pattern on at least one surface of the molded product by any typical injection molding method.

In some embodiments, the injection molding process may be carried out under conditions of an injection temperature of about 200° C. to about 320° C., for example about 210 to about 290° C., and a mold temperature of about 40° C. to about 80° C., for example about 50° C. to about 70° C. When the injection molding process is carried under these conditions, it is possible to obtain a molded product having the three-dimensional pattern formed on at least one surface thereof.

The molded product according to the present invention can have a similar appearance to actual fabric and a natural texture while having good properties in terms of impact resistance and heat resistance. Thus, the molded product may be used in various applications requiring luxurious appearance, such as an interior/exterior material for automobiles, an interior/exterior material for electric/electronic products, wallpaper, and an exterior material for construction.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Thermoplastic resin
(a) Polycarbonate resin
A bisphenol A polycarbonate resin (weight average molecular weight (Mw): 28,000 g/mol) was used.

(b1) Rubber-modified vinyl graft copolymer
A g-ABS copolymer obtained by graft copolymerization of 55 wt % of styrene and acrylonitrile (weight ratio: 75/25) to 45 wt % of butadiene rubber having a Z-average particle diameter of 310 nm was used.

(b2) Rubber-modified vinyl graft copolymer
A g-ASA copolymer obtained by graft copolymerization of 55 wt % of styrene and acrylonitrile (weight ratio: 75/25) to 45 wt % of butyl acrylate rubber having an average particle diameter of 400 nm was used.

(c) Aromatic vinyl copolymer resin
A SAN resin (weight average molecular weight: 130,000 g/mol) obtained by polymerization of 80 wt % of styrene and 20 wt % of acrylonitrile was used.

(B) Colored particles
(B1) Acicular carbon fiber (brightness: 23) having an average particle diameter of 270 μm and a cross-sectional aspect ratio of 0.056 was used.

(B2) Acicular cellulose particles (brightness: 45) having an average particle diameter of 500 μm and a cross-sectional aspect ratio of 0.03 were used.

(B3) Acicular cellulose particles (brightness: 28) having an average particle diameter of 3,000 μm and a cross-sectional aspect ratio of 0.033 were used.

(B4) Acicular carbon fiber (brightness: 23) having an average particle size of 150 μm and a cross-sectional aspect ratio of 0.33 was used.

(B5) Acicular cellulose particles (brightness: 27) having an average particle diameter of 3,300 μm and a cross-sectional aspect ratio of 0.009 were used.

(B6) Acicular cellulose particles (brightness: 32) having an average particle diameter of 500 μm and a cross-sectional aspect ratio of 0.03 were used.

Examples 1 to 3 and 10 to 12 and Comparative Examples 1, 2, and 7 to 10

The aforementioned components were mixed in amounts as listed in Tables 1, 2, and 3, followed by melt extrusion in a twin-screw extruder (L/D: 35, Φ: 45 mm) at 220° C., thereby preparing pellets. The prepared pellets were dried at 80° C. for 2 hours or more and then subjected to injection molding using a 10 oz. injection machine provided with a mold capable of forming a three-dimensional pattern having a ten-point average roughness (Rz) of 401 μm under conditions of a molding temperature of 230° C. and a mold temperature of 60° C., thereby preparing a specimen. The prepared specimen was evaluated as to the following properties. Results are shown in Tables 1, 2, and 3.

Examples 4 to 9 and Comparative Examples 3 to 6 and 11

The aforementioned components were mixed in amounts as listed in Tables 1, 2, and 3, followed by melt extrusion in a twin-screw extruder (L/D: 35, Φ: 45 mm) at 260° C., thereby preparing pellets. The prepared pellets were dried at 100° C. for 2 hours or more and then subjected to injection molding using a 10 oz. injection machine provided with a mold capable of forming a three-dimensional pattern having a ten-point average roughness (Rz) of 401 μm under conditions of a molding temperature of 270° C. and a mold temperature of 60° C., thereby preparing a specimen. The prepared specimen was evaluated as to the following properties. Results are shown in Tables 1 and 2.

Comparative Example 9

A specimen was prepared in the same manner as in Example 1 except that a mold capable of forming a three-dimensional pattern having a ten-point average roughness (Rz) of 25 μm was used. The prepared specimen was evaluated as to the following properties. Results are shown in Table 2.

Property Evaluation (1) Color spectrum: a 3 mm×3 mm area of the three-dimensional pattern of each of the specimens prepared in Examples and Comparative Examples was scanned, followed by converting the scanned image into an image represented by 4,900 pixels, and then brightness (L*) of each pixel was measured using the CIE 1976 L*a*b* (CIELAB) color system, thereby calculating the number of different brightness values.

(2) Impact strength: Notched Izod impact strength (unit: kgf·cm/cm) was measured on a ¼" thick specimen in accordance with ASTM D256.

(3) Heat resistance: Heat deflection temperature (HDT, unit: ° C.) was measured on each of the specimens prepared in Examples and Comparative Examples at a heating rate of 120° C./hr under a load of 18.56 kgf/cm² in accordance with ASTM D648.

TABLE 1

|  |  | Example | | | | | |
|---|---|---|---|---|---|---|---|
|  |  | 1 | 2 | 3 | 4 | 5 | 6 |
| (A) (wt %) | (a) | — | — | — | 79 | 79 | 79 |
|  | (b1) | 28 | 28 | 28 | — | — | — |
|  | (b2) | — | — | — | 12.5 | 12.5 | 12.5 |
|  | (c) | 72 | 72 | 72 | 8.5 | 8.5 | 8.5 |
| (B) (parts by weight) | (B1) | 0.5 | — | — | 0.5 | — | — |
|  | (B2) | — | 0.5 | — | — | 0.5 | — |
|  | (B3) | — | — | 0.5 | — | — | 0.5 |
|  | (B4) | — | — | — | — | — | — |
|  | (B5) | — | — | — | — | — | — |
|  | (B6) | — | — | — | — | — | — |
| Brightness of (A) |  | 92 | 85 | 56 | 78 | 91 | 76 |
| Brightness of (B) |  | 23 | 45 | 28 | 23 | 45 | 28 |
| Brightness difference |  | 69 | 40 | 28 | 55 | 46 | 48 |
| Color spectrum |  | 49 | 49 | 50 | 48 | 47 | 49 |
| Impact resistance |  | 13.7 | 13.2 | 13.5 | 20.1 | 22 | 21.5 |
| Heat resistance |  | 88 | 87 | 87 | 113 | 113 | 112 |

* parts by weight: relative to 100 parts by weight of the thermoplastic resin (A)

TABLE 2

| | | Example | | | | | |
|---|---|---|---|---|---|---|---|
| | | 7 | 8 | 9 | 10 | 11 | 12 |
| (A) (wt %) | (a) | 89 | 89 | 89 | — | — | — |
| | (b1) | 4 | 4 | 4 | 28 | 28 | 28 |
| | (b2) | — | — | — | — | — | — |
| | (c) | 7 | 7 | 7 | 72 | 72 | 72 |
| (B) (parts by weight) | (B1) | 0.5 | — | — | 0.1 | 1.5 | 0.5 |
| | (B2) | — | 0.5 | — | — | — | — |
| | (B3) | — | — | 0.5 | — | — | 0.3 |
| | (B4) | — | — | — | — | — | — |
| | (B5) | — | — | — | — | — | — |
| | (B6) | — | — | — | — | — | — |
| Brightness of (A) | | 93 | 91 | 84 | 84 | 92 | 72 |
| Brightness of (B) | | 23 | 45 | 28 | 23 | 23 | 23, 28 |
| Brightness difference | | 70 | 46 | 56 | 61 | 69 | 49, 44 |
| Color spectrum | | 45 | 49 | 49 | 47 | 50 | 48 |
| Impact resistance | | 12.5 | 10.4 | 10.3 | 15.2 | 12.2 | 14.3 |
| Heat resistance | | 84 | 84 | 84 | 87 | 86 | 86 |

\* parts by weight: relative to 100 parts by weight of the thermoplastic resin (A)

TABLE 3

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A) (wt %) | (a) | — | — | 79 | 79 | 89 | 89 | — | — | — | — | 79 |
| | (b1) | 28 | 28 | — | — | 4 | 4 | 28 | 28 | 28 | 28 | — |
| | (b2) | — | — | 12.5 | 12.5 | — | — | — | — | — | — | 12.5 |
| | (c) | 72 | 72 | 8.5 | 8.5 | 7 | 7 | 72 | 72 | 72 | 72 | 8.5 |
| (B) (parts by weight) | (B1) | — | — | — | — | — | — | 0.01 | 5.5 | 0.5 | — | — |
| | (B2) | — | — | — | — | — | — | — | — | — | — | — |
| | (B3) | — | — | — | — | — | — | — | — | — | — | — |
| | (B4) | 0.5 | — | 0.5 | — | 0.5 | — | — | — | — | — | — |
| | (B5) | — | 0.5 | — | 0.5 | — | 0.5 | — | — | — | — | — |
| | (B6) | — | — | — | — | — | — | — | — | — | 0.5 | 0.5 |
| Brightness of (A) | | 84 | 86 | 81 | 75 | 93 | 71 | 75 | 86 | 74 | 36 | 39 |
| Brightness of (B) | | 23 | 27 | 23 | 27 | 23 | 27 | 23 | 23 | 23 | 32 | 32 |
| Brightness difference | | 61 | 59 | 58 | 48 | 70 | 44 | 52 | 63 | 51 | 2 | 7 |
| Color spectrum | | 17 | 49 | 14 | 49 | 15 | 47 | 15 | 49 | 27 | 4 | 12 |
| Impact resistance | | 13.5 | 8.5 | 20 | 18.5 | 10.7 | 11.2 | 17.7 | 4.3 | 13.5 | 13.7 | 21 |
| Heat resistance | | 88 | 83 | 113 | 106 | 84 | 80 | 88 | 83 | 87 | 88 | 113 |

\* parts by weight: relative to 100 parts by weight of the thermoplastic resin (A)

From the results shown in Tables 1 to 3, it could be seen that the molded product according to the present invention had 30 to 60 different brightness values and thus had a similar appearance (texture) to actual fabric (the number of different brightness values: 42) while having good properties in terms of impact resistance and heat resistance.

Conversely, the molded products of Comparative Examples 1, 3, and 5, in which the colored particles (B4) having an average particle diameter less than the range specified herein were used instead of the colored particles according to the present invention, had poor properties in terms of color spectrum, the molded products of Comparative Examples 2, 4, and 6, in which the colored particles (B5) having an average particle diameter exceeding the range specified herein were used, had poor properties in terms of heat resistance and the like, and the molded products of Comparative Examples 10 and 11, in which the colored particles (B6) having a brightness difference of less than 10 from the thermoplastic resin were used, had poor properties in terms of color spectrum. In addition, the molded product of Comparative Example 7, in which the content of colored particles was less than the range specified herein, had poor properties in terms of color spectrum, the molded product of Comparative Example 8, in which the content of colored particles exceeded the range specified herein, had poor properties in terms of impact resistance and heat resistance, and the molded product of Comparative Example 9, which was formed with a micro-patterned protrusion having a ten-point average roughness (Rz) less than the range specified herein, had poor properties in terms of color spectrum.

It should be understood that various modifications, changes, alterations, and equivalent embodiments can be made by those skilled in the art without departing from the spirit and scope of the invention.

The invention claimed is:

1. A molded product having a structure in which colored particles are dispersed in a thermoplastic resin, the molded product having a three-dimensional pattern formed on at least one surface thereof,
   wherein the colored particles have an average particle diameter of about 250 μm to about 3,200 μm, as measured using a particle size analyzer, and are present in an amount of about 0.05 parts by weight to about 5 parts by weight relative to about 100 parts by weight of the thermoplastic resin, and
   the three-dimensional pattern having a ten-point average roughness (Rz) of about 50 μm to about 500 μm and about 30 to about 60 different brightness values, the number of different brightness values being calculated by scanning a 3 mm×3 mm area of the three-dimensional pattern at a resolution of 600 dpi, converting the scanned image into an image represented by 4,900 pixels, and measuring brightness (L*) of each pixel using the CIE 1976 L*a*b* (CIELAB) color system, and the colored particles have a brightness difference of about 20 to about 99 from the thermoplastic resin.

2. The molded product according to claim 1, wherein the thermoplastic resin comprises a polycarbonate resin and/or a rubber-modified aromatic vinyl copolymer resin.

3. The molded product according to claim 2, wherein the rubber-modified aromatic vinyl copolymer resin comprises: about 10 wt % to about 100 wt % of a rubber-modified vinyl graft copolymer obtained by graft copolymerization of an aromatic vinyl monomer and a monomer copolymerizable with the aromatic vinyl monomer to a rubber polymer; and, optionally, about 90 wt % or less of an aromatic vinyl copolymer resin obtained by copolymerization of an aromatic vinyl monomer and a monomer copolymerizable with the aromatic vinyl monomer.

4. The molded product according to claim 1, wherein the colored particles comprise cellulose and/or carbon fiber.

5. The molded product according to claim 1, wherein the colored particles have an aspect ratio of about 0.015 to about 0.08.

6. The molded product according to claim 1, wherein the thermoplastic resin is a diene rubber-modified aromatic vinyl copolymer resin, and wherein the molded product has a notched Izod impact strength of about 9 kgf·cm/cm to about 50 kgf·cm/cm, as measured on a ¼" thick specimen according to ASTM D256.

7. The molded product according to claim 1, wherein the thermoplastic resin is a diene rubber-modified aromatic vinyl copolymer resin, and wherein the molded product has a heat deflection temperature (HDT) of about 82° C. to about 125° C., as measured at a heating rate of 120° C./hr under a load of 18.56 kgf/cm² in accordance with ASTM D648.

8. A method of manufacturing a molded product, comprising
injecting a thermoplastic resin composition using an injection machine provided with a mold capable of forming a three-dimensional pattern having a ten-point average roughness (Rz) of about 50 μm to about 500 μm on at least one surface of the molded product,
wherein the thermoplastic resin composition comprises about 100 parts by weight of a thermoplastic resin and about 0.05 parts by weight to about 5 parts by weight of colored particles having an average particle diameter of about 250 μm to about 3,200 μm, as measured using a particle size analyzer, and
wherein the colored particles have a brightness difference of about 20 to about 99 from the thermoplastic resin.

9. The method according to claim 8, wherein injection of the thermoplastic resin composition is performed under conditions of an injection temperature of about 200° C. to about 320° C. and a mold temperature of about 40° C. to about 80° C.

10. The molded product according to claim 1, wherein the thermoplastic resin is a combination of a polycarbonate resin and a diene rubber-modified aromatic vinyl copolymer resin, and wherein the molded product has a notched Izod impact strength of about 15 kgf·cm/cm to about 50 kgf·cm/cm, as measured on a ¼" thick specimen according to ASTM D256.

11. The molded product according to claim 1, wherein the thermoplastic resin is a combination of a polycarbonate resin and a (meth)acrylate rubber-modified aromatic vinyl copolymer resin, and wherein the molded product has a notched Izod impact strength of about 9 kgf·cm/cm to about 50 kgf·cm/cm, as measured on a ¼" thick specimen according to ASTM D256.

12. The molded product according to claim 1, wherein the thermoplastic resin is a combination of a polycarbonate resin and a diene rubber-modified aromatic vinyl copolymer resin, and wherein the molded product has a heat deflection temperature (HDT) of about 108° C. to about 125° C., as measured at a heating rate of 120° C./hr under a load of 18.56 kgf/cm² in accordance with ASTM D648.

13. The molded product according to claim 1, wherein the thermoplastic resin is a combination of a polycarbonate resin and a (meth)acrylate rubber-modified aromatic vinyl copolymer resin, and wherein the molded product has a heat deflection temperature (HDT) of about 82° C. to about 125° C., as measured at a heating rate of 120° C./hr under a load of 18.56 kgf/cm² in accordance with ASTM D648.

14. The method according to claim 8, wherein the molded product has about 30 to about 60 different brightness values, the number of different brightness values being calculated by scanning a 3 mm×3 mm area of the three-dimensional pattern at a resolution of 600 dpi, converting the scanned image into an image represented by 4,900 pixels, and measuring brightness (L*) of each pixel using the CIE 1976 L*a*b* (CIELAB) color system.

* * * * *